June 17, 1969   L. F. SKUBIC ET AL   3,449,883
MOUNTING MEANS

Filed July 31, 1967   Sheet 1 of 2

INVENTORS
LEROY F. SKUBIC
MILFORD A. JUTEN
BY  Milford A. Juten
    attorney

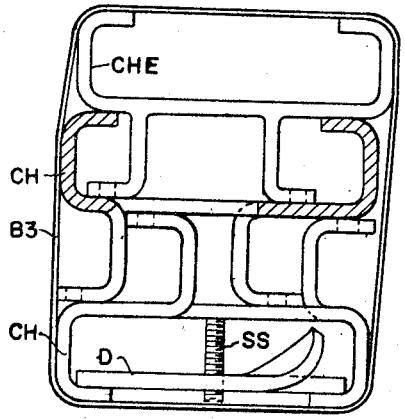
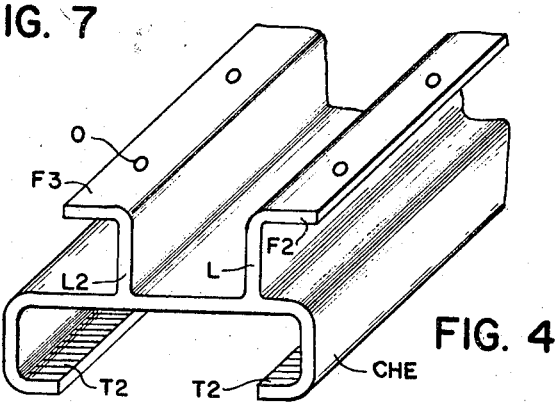
FIG. 7
FIG. 4
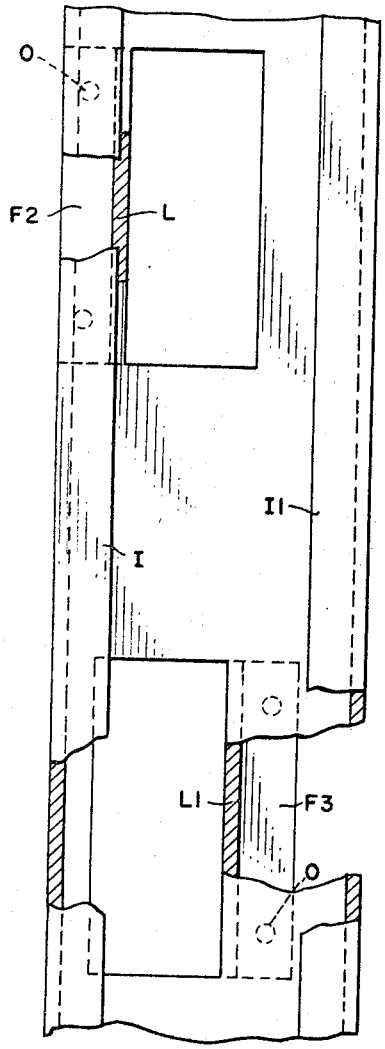
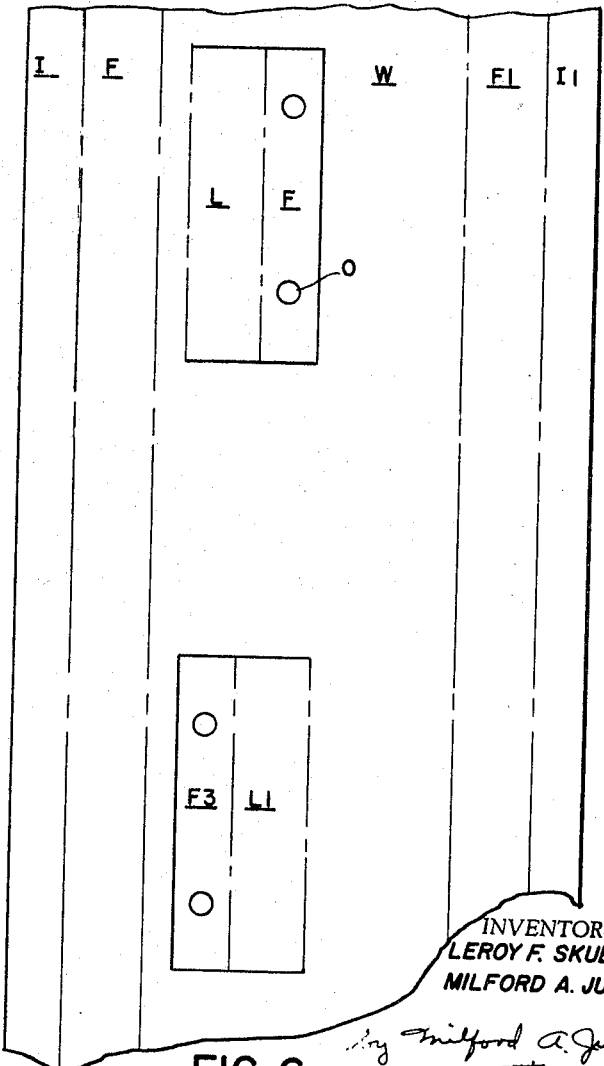
FIG. 5
FIG. 6
INVENTORS
LEROY F. SKUBIC
MILFORD A. JUTEN

United States Patent Office 3,449,883
Patented June 17, 1969

3,449,883
MOUNTING MEANS
Leroy F. Skubic, Long Beach, Ind., and Milford A. Juten, Brookmont, Md., assignors to The Paltier Corporation, Michigan City, Ind., a corporation of Illinois
Filed July 31, 1967, Ser. No. 657,148
Int. Cl. E04b 1/38; E06b 1/16; F16b 1/00
U.S. Cl. 52—710                    18 Claims

ABSTRACT OF THE DISCLOSURE

The mounting device of the present invention includes a channel having inturned margins on the free edges of the flanges and legs project from the rear or opposite surface and include feet for supporting the channel in the correct position of the inturned margins with respect to a supporting structure such as a floor or the like, so the inturned margins may be used to indicate the floor surface of concrete and also used as a screed guide. The legs and feet are adapted to be embedded in concrete or attached to supporting means to maintain the correct position. Screw receiving slide members such as circular discs are provided with threaded openings eccentrically positioned on the disc for attachment to machine screws by which a threshold or other structural element is fixedly mounted in an adjustable position with respect to the supporting structure so the threshold is in correct alignment with a door with which it is used. The channel may be made by the extrusion process or by stamping and bending sheet metal to provide legs and feet projecting from the back surface of the channel web with the legs arranged so the channels may be stacked in back-to-back relation or the legs of one channel may rest within another channel so that packages of two or three or any number of channels can be stacked and packaged.

The invention also provides for insertion of the slidable members of the mounting disc in any position in the channel by providing a radial slit in each disc and a bent out peripheral portion thereof so the disc can be inserted in any position in the channel at any time. Means are provided for positively securing the disc in adjusted position so the threaded aperture is in proper alignment for mounting the threshold or other structure. The slidable members may also be in the form of an inverted U-channel section having its ends at acute angles to provide for insertion of the slide in any position in the channel with a slidable nut in the U-channel with one or more threaded apertures for receiving attaching screws for mounting the threshold or other structure. Both the disc and U-channel and nut members may be provided with a set screw engageable with the web to retain the slide in position with the selected machine screw receiving opening of the slide in proper alignment with an index mark made on the channel web at any selected position.

---

The present invention relates to mounting means of the type shown in Patent 3,235,917 of Skubic and is of general utility for mounting a structural element on a supporting structure in a precise adjustable location.

Heretofore, structures such as thresholds have been mounted by fastening means such as wood screws for wooden buildings or metal plugs and the like for concrete buildings but it has been difficult to get the correct alignment of a threshold by the prior art devices and Patent 3,235,917 illustrates one advantageous way of getting this adjustment by means of discs mounted in a channel having inturned margins with threaded apertures in each disc arranged eccentrically. Each disc may be slid along the channel and can be turned to a desired position to locate the threaded aperture of the disc in correct alignment with a screw receiving aperture in a threshold or other structure. A disadvantage of the prior structure is that a cutout or recess was required in the channel to permit the insertion of the disc after the channel was mounted in its final position and sometimes one disc would be located directly in the recess or cutout so that that particular disc did not effectively maintain the proper force on its fastening screw. Also, discs could accidentally change location by jarring and if the channels were in a vertical position there was danger of displacement thereof. Also, the struckout portions of the channel for embedment in concrete did not provide an entirely stable base.

An object of the present invention is to provide a mounting structure of general utility which overcomes the abovementioned problems.

Another object is to provide an inexpensive mounting means which may be used in vertical as well as horizontal positions and in which the screw receiving elements are positively held in position.

Another object is to provide adjustable screw receiving elements which can be inserted in any position in a channel and will effectively retain the mounting screw and structure being mounted in fixed position.

A further object is to provide means to give maximum clearance for attaching screws to avoid having to cut the attaching screws to a precise length.

Other and further objects will be apparent as the description proceeds and upon reference to the accompanying drawings, wherein:

FIGURE 1 is a section through a floor of a building structure at the location of a door showing the channel structure of the present invention with legs projecting from the back thereof and the feet of such legs held in fixed position by threaded rods secured to a form so the inturned margins of the channel may be used as a screed guide and showing the set concrete floor completely receiving the channel and showing the threshold mounted by means of the adjustable discs of the present invention;

FIGURE 4 shows a channel structure in inverted position made of an extrusion to show the integral angle leg members having plates extending from the back edge of the web of the channel and having feet plates extending outwardly from the leg plates;

FIGURE 5 is a plan view of one form of shallow channel structure according to the present invention made from sheet metal with the angle leg made from bent out plate portions of the web of the channel;

FIGURE 6 is a surface development of the sheet material which is formed into the channel of FIGURE 5;

FIGURE 7 illustrates how the mounting channels of the present invention can be stacked in back-to-back relation and/or in nested relation with two channels formed of sheet metal, as shown in FIGURES 5 and 6, arranged back-to-back and an extruded channel of FIGURE 4 having its legs received in the upper channel whereby any number of channels can be stacked or packaged;

Figure 1:
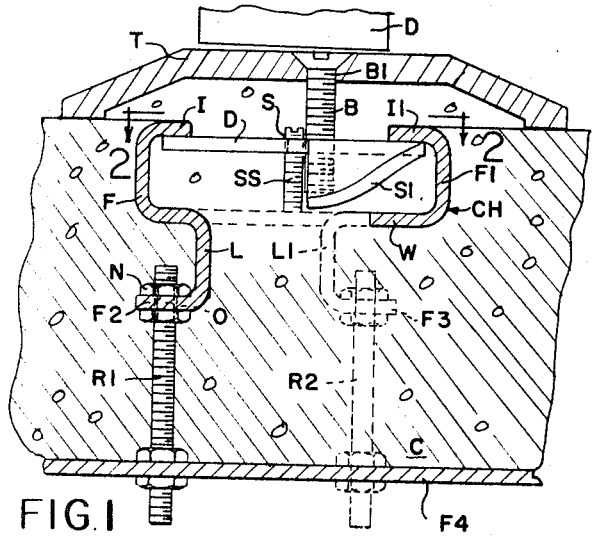
Figure 2:
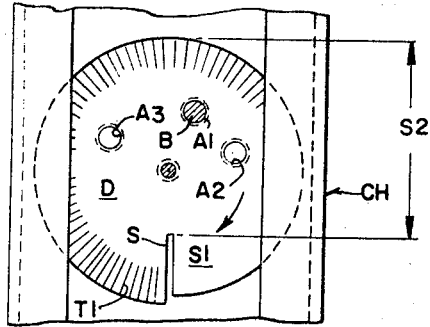
FIGURE 2 is a fragmentary plan view of the channel of FIGURE 1 with the mounting disc therein.
Figure 3:
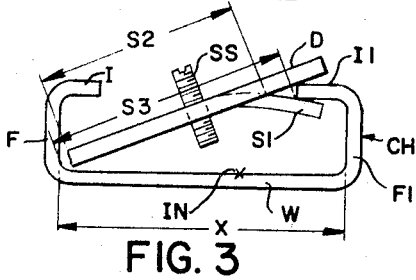
FIGURE 3 illustrates the mounting disc being inserted into the channel where the ends of the channel may be blocked or where additional fastening means is required after the channel is mounted.
Figure 9:
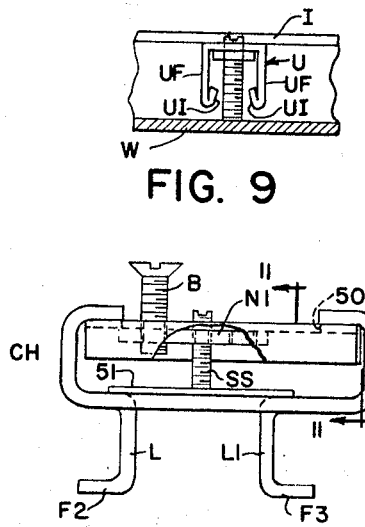
FIGURE 9 is a fragmentary section taken substantially on line 9—9 of FIGURE 8 showing the U-channel section in end elevation and the set screw retaining the mounting means in fixed position.
Figure 10:
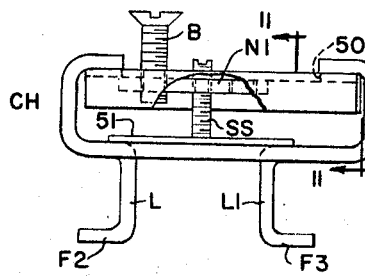
FIGURE 10 is an end view of a channel equipped with another form of the adjustment structure with a more shallow U-channel section and showing a plate overlying a cutout so the set screw can retain and maintain the structure in fixed position over a cutout.
Figure 11:
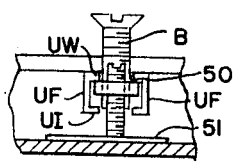
FIGURE 11 is a section taken substantially on broken line 11—11 of FIGURE 10 showing the more shallow U-channel section in end elevation.

Upon references to FIGURES 1 to 3, inclusive, a channel having a web W, flanges F, F1 and inturned margins I and I1 has a pair of depending legs L, L1 and feet F2 and F3 and such channel is positioned in a concrete floor C by means of a form F4 through apertures in which threaded rods R1 and R2 extend and such threaded rods pass through openings O and O1, respectively, in the feet F2 and F3, respectively, with the proper positioning being obtained by nuts N which engage the form F4 and the feet F2 and F3, whereby the inturned margins I and I1 are positioned at the top level of the concrete floor C so that the exposed surfaces of the inturned margins I and I1 may serve as a screed guide and the channel generally designated CH can be accurately mounted to serve as a screed guide during the pouring of the concrete floor C.

To mount a threshold T in proper position with respect to a door D and a door frame on which it is mounted, mounting discs D of generally circular outline and of a diameter to be freely received in the width X of the space between the inner surfaces of the flanges F and F1 which is provided with a slit S extending radially inwardly from the periphery thereof and the adjacent segmental portion S1 is removed from the plane of the disc such as by bending downwardly out of the plane of the disc D as shown in FIGURE 3 leaving an effective dimension S2 between the slit S and the opposite edge of the disc less than the distance S3 between the free edge of an inturned margin and the dihedral angle between the opposite flange and the web of the channel whereby the disc D may be rotated clockwise in the direction of the arrow in FIGURE 2 when the peripheral portion opposite the slit S is located in the dihedral angle formed by the web W and the flange F as shown in FIGURE 3 so that the bent portion S1 passes under the inturned margin I1 while the adjacent portion of the disc passes over the inturned margin I1 and further rotation causes the edge formed by slit S to pass within the space between inturned margins I and I1 whereby the entire disc is located within the channel CH and beneath the inturned margins.

Prior to the insertion of the disc D or subsequent thereto, marks are made on the inner surface of the web W at the location of bolts B passing through apertures B1 in the threshold T. Each disc is provided with one or more threaded apertures A1, A2 and A3 each of which may be threaded with a different size tap to receive different sizes of bolts and the bolt B is shown as threaded into aperture A1. When the precise location of the bolt B is known, such location may be marked on the web W by means of a nail or the like passing through aperture B1 in the threshold, the disc D is positioned so that the threaded aperture A1 lies directly over the index mark IN and the disc is secured in position by the set screw SS threaded into a centrally threaded aperture in the disc D so that the bottom of the set screw engages the web W thereby retaining the disc D against the inner surfaces of the inturned margins I and I1 whereby the disc will be retained in position even though jarring of the building occurs. Further, the disc being positioned against the inturned margins I and I1 is spaced from the web W the greatest amount so that the bolt B can be of substantial length and the excess length can be accommodated between the disc D and the web W before the end of the bolt engages the web thereby avoiding the necessity of having many different lengths of screws or the cutting of screws on the job with resulting delays.

In FIGURE 4 the extrusion formed channel CHE of aluminum or similar metal has the parts thereof identified by the previously used reference numerals to avoid repetition in the explanation thereof. It will be noted that legs L and L1 and feet F2 and F3 extend the full length of the extrusion channel CH and may be provided with bolt or other fastening receiving openings O in selected positions for receiving nails, screws or threaded rods such as R1 and R2.

FIGURE 6 shows a surface development of a section of the channel CH with the bend lines being indicated by dash lines and the various parts defined by the dash lines being identified with the previously used corresponding reference characters. The leg L and foot F2 are formed by slit S extending along the length of the foot F2 and the ends of the leg and foot sections L and F2, respectively, with suitable openings O being provided for receiving fastener elements. The leg L1 and foot F3 are formed in a similar manner by slits indicated by the full lines along the length of foot F3 and the ends of the leg and foot plates L1 and F3. The sheet material is bent into shape in a well known manner to form the completed channel as shown in FIGURES 1, 5 and the two lower channels of FIGURE 7.

From the above description, the use of the invention and the advantages thereof are believed to be obvious and it will be apparent that the channel can be mounted in wood as well as in concrete floors but is particularly suitable for concrete floors and the concrete may extend up through the cutouts formed by the legs and have no objectionable results since each disc is relatively thin with respect to the depth of the space between the web W and the inturned margins I and I1 and the bent out section S1 of the disc can be manipulated to clear any objectionable protrusion of the concrete into the channel. The set screw SS can engage either the web W of the channel or the concrete protruding through the cutouts to retain the disc in its uppermost position and to maintain the selected threaded aperture of the disc in proper alignment with the bolt receiving aperture B1 of a threshold or other structure being mounted. To additionally secure the discs against unintentional sliding movement, the peripheries thereof may be roughened in the manner of knurling or provided with teeth T1 to more effectively engage the inner surfaces of the inturned margins I and I1. The inner surfaces of the inturned margins may also be roughened or provided with teeth T2.

The spacing between the legs L, F2 and L1, F3 is appreciably more than the diameter of a disc D so that a disc D may be positioned in the channel as shown in FIGURE 5 and retained therein by legs of another channel nested within the channel carrying the disc D in a manner similar to that shown with respect to the channel CHE having its legs received in the intermediate channel CH in FIGURE 7.

The channels may be nested by sliding one channel into the other or the channels may be nested by extending one foot of one leg beneath one inturned margin of another channel and then pivoting the first channel so that its other leg clears the other inturned margin of the other channel and the legs then can rest on the web of the first channel, as illustrated with respect to center channel CH and upper channel CHE in FIGURE 7.

Another form of slidable means is shown in FIGURES 8 to 11, inclusive, where an inverted U-channel section has a web UW and side flanges UF and inturned margins UI with each section being approximately the length corresponding to the width X of the space between the inner surfaces of the flanges F and F1 of the channel CH. The web UW is provided with a slot 50 of a length Y approximately the spacing between the inner edges of the inturned margins I, I1 and a width appreciably less than the spacing Z between the flanges UF, UF and of a width BZ greater than the maximum diameter of a fastening screw bolt B. Within the channel section U is a nut structure N1 which is freely slideable within the channel section and is retained therein by the inturned margins U1, U1. The nut structure N1 is provided with a pair of bolt receiving screw threaded openings A2 and A3 adjacent each end and a set screw SS intermediate the ends of the nut structure adapted to engage the web W, the concrete C or a plate 51 in the event that the set screw SS is located over one of the cutouts. It will be evident that the channel section U can be positioned anywhere along the length of the channel CH and one of the screw threaded openings A3 or A2 located directly in alignment with a bolt receiving aperture B1 in a threshold T or other structure being mounted. After the alignment of the threaded aperture A3 and A2 is attained the set screw SS is screwed against the plate 51 or the web W thereby retaining the nut structure N1 and the channel section in fixed position so that the threshold may be easily mounted even though the channel CH extends at a different angle from the threshold or extends to one side of the center line of the threshold since the nut structure N1 can be positioned anywhere along the length of the channel.

The nut structure N1 is retained in the channel section U by the set screw SS extending through the slot 50 since the set screw prevents the nut structure N1 from complete removal from the U channel by abutment of the upper end of the set screw against the adjacent end of the slot 50.

Figure 8:
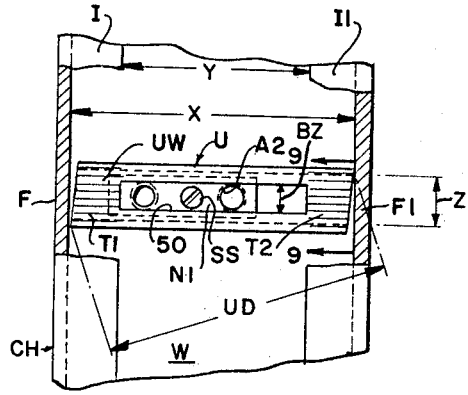
FIGURE 8 is a fragmentary view with parts broken away showing another form of the invention including a U-channel section carrying a nut structure having a pair of bolt receiving threaded openings and a set screw for retaining the channel section and the desired threaded opening in any desired location.

FIGURE 8 shows the ends of the U channel section U of substantially parallelogram shape as seen in plan with the top left corner and bottom right corner cut away a sufficient distance so that the distance between such corners is less than the spacing between the inner surfaces of the flanges F while the upper right corner and lower left corner are abutting the flanges F and F1 and are spaced apart a greater distance UD than the spacing between the inner surfaces of flanges F and F1 so that the U channel section is substantially perpendicular to the flanges F and F1 when the U channel section U is rotated in a clockwise direction.

This parallelogram arrangement as seen in plan permits the insertion of any slide anywhere along the length of the channel CH and the U channel is prevented from excess clockwise motion which might otherwise be caused by rotation of the bolt B in a tightening direction assuming the bolt B to be right hand screw threads.

The end portions of the web UW of the channel section U may be provided with teeth T1 which may cooperate with similar teeth T2 on the inner surface of the inturned margins I and I1 to more positively retain the slide in fixed position.

From the above description it will be evident the mounting means for securing a structural element to a structure of the present invention provides for locating attaching screws in an infinite number of locations between the inturned margins of a channel with positive means to retain the threaded aperture for receiving the bolt in the selected position regardless of the position of the channel whether such channel is vertical, horizontal, right-side-up or inverted or any of the positions in-between and accordingly the mounting means of the present invention provides for the universal mounting of practically any structural element.

The channel and the slide members may be assembled in a package with discs D or nut assemblies 50, N1, secured by set screws SS within the channel. Several of such channels can be fastened together by a band B3 of metal, strong tape or the like as shown in FIG. 7, thereby securing all the parts together for shipment in any quantity without necessitating additional wrapping or packaging.

Changes may be made within the spirit of the invention as defined by the valid scope of the claims.

What is claimed is:

1. A channel for use in mounting a structural element to a structure, said channel including a web, flanges and inturned margins on one side of the web and a pair of legs extending from the opposite side of the web, each leg including a leg plate extending substantially transverse to the web and a foot extending outwardly from each leg plate, the foot of one leg extending substantially to one edge of the channel and the foot of the other leg extending toward the opposite edge of the channel but spaced from said opposite edge of the channel by an amount approximately the thickness of the first leg plate and the width of its foot whereby one channel may be stacked in back-to-back relation with respect to the other.

2. The invention according to claim 1 in which the spacing between the free edges of opposite feet is less than the distance between one inturned edge and the dihedral angle formed between the opposite flange and its web whereby another channel may be received within one channel for stacking in the same direction.

3. A package made of a plurality of channels according to claim 1 in which the channels are arranged in either back-to-back relation or back-to-front relation or both back-to-back and back-to-front relation, and means are provided to retain the channels together.

4. The invention according to claim 1 in which a slide member having means to secure a fastener to the slide member is mounted in the channel and adjustable to locate the fastener in any position along the channel between the inturned margins.

5. The invention according to claim 4 in which at least one of the channel and the slide member is provided with teeth to prevent sliding movement when the fastener is securely attached to a structural element and the slide member.

6. The combination of a shallow channel having inturned margins on its flanges, said inturned margins being of a width in the order of the depth of the channel, a slide member mounted in said channel, said slide member having one dimension greater than the spacing between the inturned margins and less than the spacing between the flanges of the channel and substantially the spacing between the flanges, said slide member having another dimension less than the spacing between the free edge of one inturned margin and the dihedral angle formed between the opposite flange and the web of the channel whereby said slide member may be inserted into the channel at any position along the length of the channel by positioning the slide member having its smaller dimension extending between an inturned margin and the dihedral angle formed by the opposite flange and the web and the rotation of the slide member will cause the large dimension portion of the member to lie within the channel beneath the inturned margins and underlapping such inturned margins, and means on said member for receiving a fastening element for mounting a structural element such as a threshold, said means for receiving a fastening element being positionable in substantially all locations between the inturned margins.

7. The invention according to claim 6 in which the slide member is provided with sharp teeth to effectively engage the inturned margin of a channel.

8. The invention according to claim 7 in which the slide member is positioned within a channel and the channel has sharp teeth on the inner surface of the inturned margins.

9. The invention according to claim 6 in which the slide member is provided with at least one threaded aperture for receiving a machine screw.

10. The invention according to claim 6 in which the slide member is provided with a threaded aperture and a set screw is threaded through said aperture for engagement with the web of a channel to positively retain the member in contact with the inturned margins.

11. The invention according to claim 6 in which the slide is a generally circular disc having a slit extending inwardly from the periphery with a segment adjacent the slit removed out of the plane of the disc whereby the disc may be inserted by a rotary motion by placing the removed segments portion of the disc under one inturned margin while the opposite periphery of the disc lies in the dihedral angle formed by the opposite flange and the web.

12. The invention according to claim 11 in which the circular disc is provided with a centrally positioned threaded aperture and a set screw is threaded through said aperture to engage the web to retain the disc against the inturned margins and the means for attachment of a fastening element is eccentrically located.

13. The invention according to claim 6 in which the member is a U-channel section having a nut element having a threaded aperture and slidable in said U-channel and the web of said U-channel is provided with a fastener receiving slot extending to adjacent each end for receiving a fastening screw for reception in the nut element.

14. The invention according to claim 11 in which the nut element includes a plurality of different sizes of threaded apertures.

15. The invention according to claim 13 in which the U-shaped channel is open and is provided with inturned margins retaining the nut element in the U-channel whereby the nut element can be accurately positioned and the fastening screw can extend through the nut element and through the U-channel section to provide maximum axial movement of the screw.

16. The invention according to claim 13 in which the nut element has a plurality of threaded apertures therethrough and a set screw extends through one of the apertures and engages the web of a channel and another threaded opening in the nut element may be positioned directly over any mark on the web of a channel so that the opening permits viewing of the mark on the channel web whereby the correct alignment of the nut element can be determined and the set screw may be adjusted to fix the nut element in correct alignment.

17. The invention according to claim 13 in which the U-channel section has at least one end cut at an angle to permit insertion of the channel section in any point along the length of a channel, and to retain the U-channel against displacement.

18. The invention according to claim 17 in which the U-channel has one dimension that is greater than the distance between the flanges of the channel so the U-channel section will be prevented from rotation in one direction.

References Cited

UNITED STATES PATENTS

| | | | |
|---|---|---|---|
| 1,430,931 | 10/1922 | Blackall | 52—710 |
| 1,561,126 | 10/1925 | Timm | 52—710 |
| 2,456,039 | 12/1948 | Abramson | 248—23 |
| 2,952,946 | 9/1960 | Lucas | 248—23 |
| 3,235,917 | 2/1966 | Skubic | 49—468 |

FRANK L. ABBOTT, *Primary Examiner.*

JAMES L. RIDGILL, Jr., *Assistant Examiner.*

U.S. Cl. X.R.

49—468; 52—738; 248—23; 287—189.36